July 17, 1962 — C. H. SAVIT — 3,045,241

OSCILLOGRAPHIC CAMERA

Filed March 18, 1957 — 2 Sheets-Sheet 1

INVENTOR.
CARL H. SAVIT,
BY Spensley & Horn
ATTORNEY.

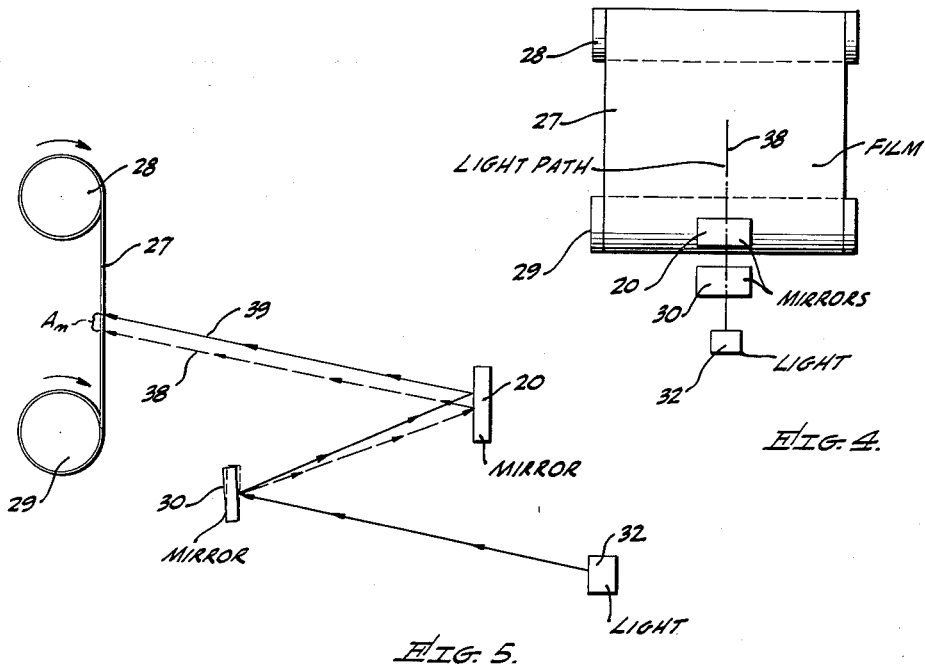
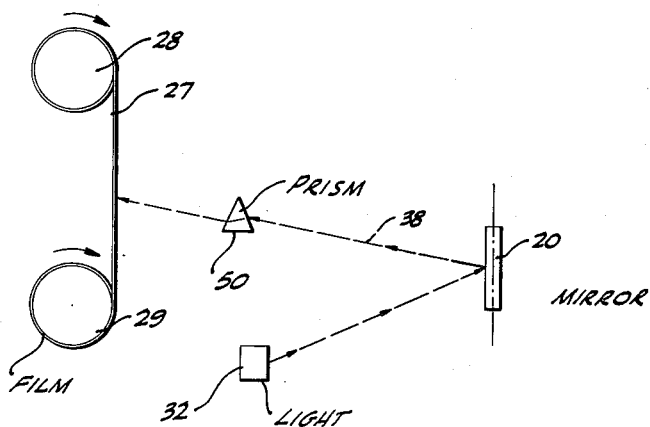

United States Patent Office 3,045,241
Patented July 17, 1962

3,045,241
OSCILLOGRAPHIC CAMERA
Carl H. Savit, Van Nuys, Calif., assignor to Western Geophysical Company of America, Los Angeles, Calif., a corporation of Delaware
Filed Mar. 18, 1957, Ser. No. 646,731
5 Claims. (Cl. 346—109)

This invention relates to oscillographic cameras and more particularly, to an improved multi-channel oscillographic camera having independent time scale calibrations on each channel.

In many applications in which oscillographic cameras are used it is desirable for special purposes to be able to introduce arbitrary time origin corrections and linear or non-linear time scale calibrations into the oscillograph record. In particular, it is desirable in many instances to be able to apply such corrections and calibrations independently and variably to each channel of a multi-channel recording system. Although such corrections and calibrations are advantageous in many applications wherein oscillographic recording cameras are used, they are particularly desirable in connection with such cameras when employed in making seismographic records in geophysical exploration. Accordingly, the present invention will be described in connection with an oscillographic camera used in geophysical exploration as an illustrative application and embodiment.

In making seismographic surveys by the so-called reflection method, a record is made of the earth's disturbance produced at a given point by a detonation initiated near the earth's surface at another point. In general, the record shows waves which have traversed paths close to the earth's surface and waves which have penetrated the earth and have been reflected by interfaces between two layers of different properties or characteristics. In many cases, several interfaces are present at varying depths and the record will show waves reflected from such interfaces. The amplitude of such reflected waves will vary over a considerable range depending upon the reflection coefficient associated with each interface.

For purposes of illustration, in a common arrangement of seismographic exploratory and recording apparatus used for seismographic profiling work a plurality of seismometer or detector groups are disposed in contact with the ground in a preferably straight line at opposed sides of the shot point. A recording unit, provided with suitable amplifying and recording means, is electrically connected to the detectors to amplify and record the electrical impulses produced by the detectors upon the arrival at each detector group of seismographic waves generated by an explosion at the shot point and reflected by the various underground formations.

The electrical impulses produced by the detector groups are recorded by a multi-channel oscillographic camera with a channel corresponding to each detector group. Various recording methods such as variable amplitude, variable area and variable density are used in the art, but all are time-scale records of the shock waves received at the detector groups. The desirability of being able to apply time origin corrections and time scale calibrations into a seismographic recording oscillographic camera is readily apparent, for example, in introducing "move out" corrections. That is, since the detector groups are at varying horizontal distances from the shot point a greater time interval will be required for a reflected wave to reach the outermost detector group than is required to reach an inner detector group from an interface the same vertical distance below each. As the depth of the reflection increases the time differential required to reach the various detector groups becomes proportionally smaller with the time differential approaching zero as the depth of reflection approaches infinity. Furthermore, the various detector groups will, in general, be situated at varying elevations so that it will be desirable to make time adjustments to reduce all readings to a common horizontal plane. Similar time origin adjustments are often necessary to compensate for varying amounts of near-surface weathered material under the different detector groups.

Accordingly, it is an object of the present invention to provide means for introducing time origin corrections into an oscillographic record.

It is another object of the present invention to provide means for applying time scale calibrations into an oscillographic record.

It is a further object of the present invention to provide means for applying arbitrary time origin corrections and linear or non-linear time scale calibrations independently and variably to each channel of a multi-channel recording system.

It is still another object of the present invention to provide apparatus for applying time origin corrections and time scale calibration to oscillographic cameras of the type well known to the art.

The present invention comprises in a multi-channel oscillographic camera, a plurality of time mirrors, each of which is positioned in the light path of a channel. The mirror is positioned between the light source and galvanometer mirror of the oscillographic camera and is rotatable about an axis substantially perpendicular to the direction of motion of the recording medium such as paper, film or photographic material, and substantially parallel to the plane of the recording medium, whereby the time mirror may be rotated to vary the time scale position at which the light path strikes the recording medium.

The novel features which are believed to be characteristic of the invention, both as to its organization and method of operation, together with further objects and advantages thereof, will be better understood from the following description considered in connection with the accompanying drawings in which a presently preferred embodiment of the invention is illustrated by way of example. It is to be expressly understood, however, that the drawing is for the purpose of illustration and description only and is not intended as a definition of the limits of the invention.

FIGURE 4 is a view taken along line 4—4 of FIGURE 3;

FIGURE 5 is a view corresponding to FIGURE 3 in which the time mirror has been rotated; and FIGURE 6 is a view corresponding to FIGURE 3 of an alternative embodiment of the present invention.

Figure 1:
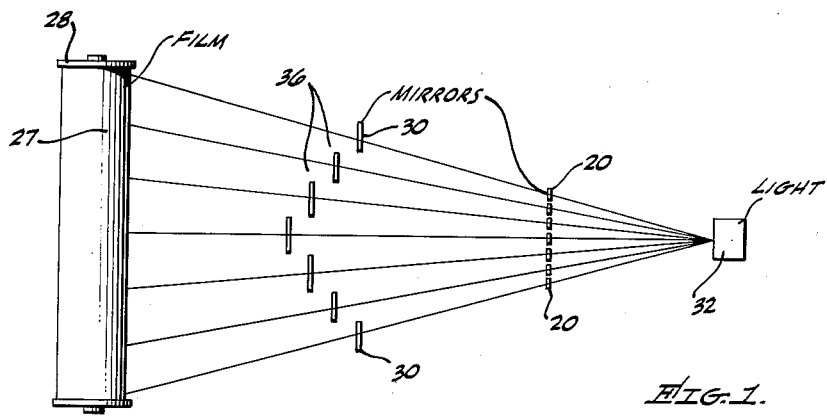
FIGURE 1 is a diagrammatic view of a multi-channel oscillographic camera constructed in accordance with the present invention.

Referring to the drawings, FIGURE 1 diagrammatically indicates the presently preferred embodiment of the invention used in conjunction with an illustrative multi-channel oscillographic camera having seven recording channels. Again using a seismographic exploration apparatus as an illustrative application of the present invention, an amplifying unit is electrically connected to the detector groups to amplify the electrical impulses produced by the detectors upon the arrival at each detector of seismographic waves generated by an explosion at the shot point and reflected by the various underground formations as discussed hereinbefore.

It is to be expressly understood that although seismographic exploration is used as an application in which the present invention is particularly desirable, it is not limited thereto and may be used in any application of an oscillographic camera in which it is desirable to introduce arbitrary time origin corrections or time scale calibrations.

The intensity of the electrical signal is transmitted by the detector group or other signal source through the amplifier to a galvanometer where it is impressed across the wire loop of the galvanometer, to which a mirror is affixed and which is disposed in the field of a permanent magnet. Thus, the mirror is rotated about a vertical axis by an amount proportional to the electrical impulse received at the galvanometer which is, in turn, proportional to the intensity of a reflected shock wave received at an individual detector group.

If a beam of light is focused upon the mirror and reflected as a single point of light from the mirror onto a photographic film which is moved at a constant speed, as, for example, by a synchronous motor, the changes in the seismographic wave reaching the single detector group will cause the mirror to be rotated in direct proportion to the wave, or signal intensity, and reproduce a trace upon the photographic film which has the characteristics of the reflected seismographic wave or other variable amplitude signal reaching the detector or emanating from the signal source.

The record produced upon the recording medium is thus a time scale record of the signal intensity with the time scale $t$ introduced by the movement of the recording medium at a constant speed past the recording point. The present invention achieves time origin corrections and time scale calibration which consists of applying to the time scale $t$ a transformation of the form $$T = t + A_n + F_n(t)$$

where the parameter $A_n$ and the function $F_n$ may vary from channel to channel as indicated by the index $n$. These quantities are capable of being varied at will. In the language of the computer art, the time transformation is capable of being pre-programmed. $A_n$ is capable of being given the same value for all $n$, and $F_n(t)$ is capable of being set equal to zero.

Figure 2:
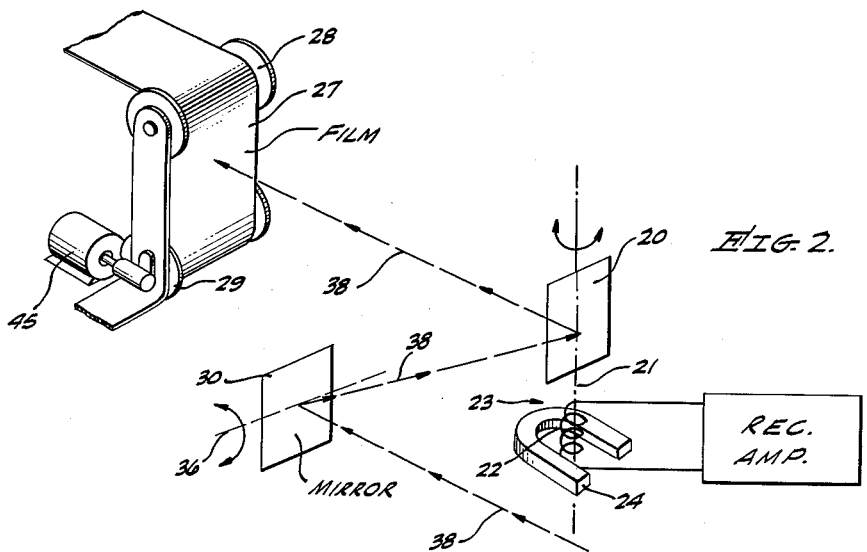
FIGURE 2 is a diagrammatic view in perspective of the presently preferred embodiment of the present invention showing a single channel for clarity of description.

Referring now particularly to FIGURES 1 and 2, a plurality of oscillating mirrors 20, equal in number to the number of channels in the oscillographic camera are arranged in side by side relationship. Each mirror 20 is affixed to a vertical shaft 21 which is in turn affixed to the movable coil 22 of a galvanometer 23. The coil of each galvanometer is rotated within the permanent magnet 24 by an amount proportional to the electrical signal impressed upon it. In the embodiment shown in FIGURE 1, seven channels are shown thereby providing a multi-channel oscillographic camera in which seven signals are recorded simultaneously in side by side relationship upon a seven channel photographic record. The electrical signal transmitted to each galvanometer causes the respective mirror 20 to be rotated about a vertical axis through an arc which is proportional to the electrical signal impressed upon the coil and which will vary with varying intensity of the signal. The galvanometer and mirror are of the type well known to the art and are not shown or described in detail.

Although a multi-channel oscillographic camera and recording system are described in detail throughout the specification, it is to be understood that the present invention may also be utilized in a single channel oscillographic camera.

The recording medium such as photographic film 27 is positioned in a vertical plane substantially parallel to the plane of the vertical axes of the mirrors 20 and at a substantial distance therefrom. The photographic film is mounted on an idler roll 28 and a driven roll 29 which is driven by a motor to move the film at a constant rate of speed in the vertical plane. The means for mounting and moving the photographic film is well known to the art.

A plurality of time mirrors 30 are positioned between the light source 32 and the galvanometer mirror 20 such that light emanating from the light source is reflected to and focused upon each galvanometer mirror 20. That is, in the presently preferred embodiment the number of time mirrors is equal to the number of channels and the time mirrors are positioned between the light source 32 and mirrors 20 to focus a point of light upon each galvanometer mirror 20. In the presently preferred embodiment the light source which is utilized is a zirconium arc which transmits a beam of light approximately 3 mils in diameter. In this embodiment therefore no further focusing or collimating means are necessary since the light beam is substantially a point of light throughout the system. When a conventional light source is used focusing and collimating means well known to the art will be used to produce a point of light at the plane of the moving film. As discussed hereinbefore, as the galvanometer mirror 20 rotates, the point of light is deflected horizontally at the plane of perpendicularly moving film to produce a time scale record of the intensity of the signal received at the galvanometer mirror.

The time mirrors 30 in accordance with the present invention are each oriented to rotate about an axis 36 substantially perpendicular to the direction of motion of the recording film 27 and substantially parallel to the plane of the film.

Figure 3:
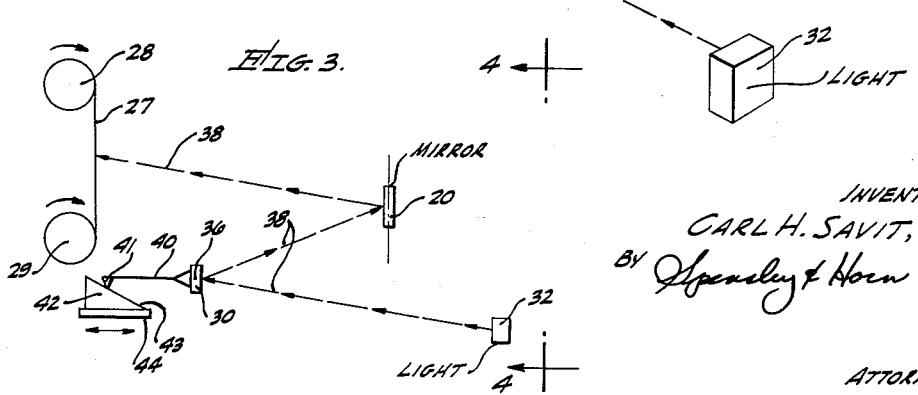
FIGURE 3 is a diagrammatic view in elevation of a single channel in an oscillographic camera constructed in accordance with the present invention.

The light path 38 as shown in FIGURE 3 is from the light source 32 to the time mirror 30 from whence it is reflected to the galvanometer mirror 20. It is then reflected from the galvanometer mirror 20 to the photographic film 27 which is moving downward in FIGURE 3.

Referring to FIGURES 3 and 5, when the time mirror is rotated about the axis perpendicular to the direction of motion of the recording medium 27 the light path will be displaced along that direction of motion. Thus, when the time mirror 30 is angularly displaced counterclockwise from the position of FIGURE 3 to the position of FIGURE 5, the light path is shifted upward in the plane of the recording film 27 from the dotted light path 38 corresponding to FIGURE 3 to the displaced light path 39. The light path has thus been displaced along the direction of motion of the recording film. Since the time scale on an oscillographic record is measured along the direction of motion of the recording, such a displacement is tantamount to an alteration of the time scale. Therefore, an angular displacement of the time mirror 30 is equivalent to a change of origin of the time scale and a rotation of the time mirror will yield a calibration of the time scale.

In FIGURE 5, if the recording position of light path 38 is the zero or origin point of the time scale record being recorded with the photographic film being moved downward, the displacement of light path 39 caused by the angular displacement of the time mirror 30 causes the origin to be shifted by an amount $A_n$ as shown. Since the displacement is along the direction of motion but opposite thereto, the factor $A_n$ is positive and a trace recorded by light path 39 will lag the trace of light path 38 by the amount $A_n$.

Calibration of the time scale is achieved by rotation of the time mirror 30 during movement of the film record 27. The calibration may be made linear or non-linear by suitably varying the rate of rotation of the time mirror. The galvanometer mirror 20 of the oscillographic camera will, by its motion in response to a signal, impart to the light beam and hence to the oscillographic trace, a motion perpendicular to the direction of motion of the recording film, while the time mirror 30 imparts a motion in the direction of movement of the film. The motions imparted to the light beam by the two mirrors are independent of each other. Rotation of the time mirror introduces the function $F_n(t)$ where $F_n(t)$ may be controlled by the rate of rotation. Displacement $A_n$ and rotation $F_n(t)$ of the time mirror 30 may be controlled electrically or mechanically. Electrical control may be effected through mounting the time mirror on a galvanometer in a manner well known to the art or through the use of a Selsyn motor or other servo mechanism. Mechanical movement of the mirror may be effected through a system of levers or linkages or by means of cams, gears, racks and pinions, templates or other mechanical or electro-mechanical devices. In the presently preferred embodiment shown partially diagrammatically in FIGURE 3, both displacement ($A_n$) and calibration $F_n(t)$ are accomplished by means of a mechanical cam system in which a lever arm 40 is affixed to the non-reflecting side of the mirror with a cam follower 41 positioned at the opposite end of the lever arm. A linear cam 42 is shown having a linear cam surface 43 upon which the cam follower rides. The cam is moved horizontally at a predetermined rate causing the cam follower to be raised or lowered according to the direction of motion of the cam. Since the lever arm 40 is affixed to the mirror 30 and pivoted about the axis of the mirror 36 the rise or fall of the cam follower will cause the mirror 30 to be rotated. Thus, as the cam is moved to the right in FIGURE 3 the mirror is rotated clockwise.

In the presently preferred embodiment a cam 42 for each channel is mounted upon a cam plate 44 which is moved through appropriate gearing (not shown) by the film drive motor 45. Each cam surface is determined to give an initial desired displacement plus a rate of movement $F_n(t)$ of the respective time mirror 30. The programming of the time transformation is thus accomplished by suitably forming the surface 43 of the individual cam 42 and by suitably controlling the rate of movement and displacement of the cam plate 44.

Various electrical and mechanical means for rotating the time mirror about the axis 36 will be apparent to one skilled in the art in view of the present disclosure. When a cam such as that utilized in the presently preferred embodiment is employed it is necessary only that the rate of movement of the cam plate 44 be correlated with the rate of movement of the recording film.

Thus, in operation the cam 42 for each mirror 30 causes the mirror 30 to be rotated from the zero origin position of FIGURE 3 to alter the origin of each channel by an amount equal to $A_n$ where $n$ corresponds to the number of the channel. The recording film is set in motion and simultaneously movement of the cam plate 44 and the cams 42 affixed thereto is commenced. During recordation of the seven oscillographic traces the time mirrors are rotated at a rate determined by the cam surface 43 of the respective cam 42 to achieve rotation equal to $F_n(t)$ where $n$ is again the number of the channel. $F_n(t)$ is linear or non-linear according to the cam surface which may be formed to provide any given function by one skilled in the art. Alternatively the cams 42 may each be linear with rise rates determined by the index $n$ and the cam plate 44 may be moved by the film drive motor through the intervention of a cam or template, this alternative has particular utility in those cases in which the functions $F_n(t)$ are of the form $F_n(t) = B_n F(t)$ as is often the case in the seismographic art. In this alternative the rise rates of the cams 42 are determined in accordance with the factors $B_n$ while the cam plate 44 is driven in accordance with the function $F_n(t)$. It may thus be seen that by means of the present invention it is possible to pre-program into the oscillographic camera any of a wide range of time-scale, functional transformations limited only by the mechanical limitations of speed, traverse and curvature of the mechanical components involved.

The time mirror 30 is, in the most general case as shown in the illustrative embodiment, separate for each channel and separately controlled for each channel. It may, however, for certain purposes, be desirable to omit the time mirror from some channels or alternatively to use a given time mirror in common for two or more channels. In the case in which a time mirror serves two or more channels, the time scale change and calibration is common to those channels provided that the shape of the mirror is suitably designed and provided that the mirror rotates about a suitably oriented axis. By changing the axis of rotation and/or the shape of the time mirror, it is possible to achieve a limited fixed relationship among the time calibrations or origin changes of the various channels concurrents affected by that time mirror.

FIGURE 6 illustrates an alternative embodiment of the present invention in which a prism 50 is used to vary the position of the light path of the camera. In the alternative embodiment the prism 50 is at a position between the galvanometer mirror 20 where it is reflected to the prism 50 and refracted to a displaced position on the moving recording film 27. The prism 50 is rotatable to vary the origin displacement $A_n$ and to achieve the calibration $F_n(t)$.

The position of the time mirror for optimum results in a given application may be readily determined by one skilled in the art in view of the foregoing discussion. In addition it may sometimes be desirable to reverse the positions of the galvanometer mirror 20 and the time mirror 30. The criteria upon which the choice of location of the time mirror is to be based are those of the relative magnitudes of the displacements of the oscillographic trace to be attributed to the calibration or origin change of the time scale and the magnitude of the displacements of the oscillographic trace due to fluctuations to be recorded by the galvanometer mirror 20 is responsive to the signals received. In addition, questions of available space and construction may be determinative.

Thus, the present invention provides an improved oscillographic camera having means provided for varying the origin point of a light trace to be recorded and to furnish linear or non-linear time scale calibrations independently and variably to each channel of multichannel recording system.

What is claimed is:

1. In a channelized oscillographic camera of the type wherein a plurality of light beams are transmitted for recordation to a recording film moving at a constant rate from a plurality of mirrors which oscillate to vary the position of the light beam in the respective channel perpendicular to the direction of motion of the recording film to provide a time-scale record of the oscillations of the mirrors, means for varying the time-scale position at which the light beam strikes the moving recording film in each of said channels, comprising: a plurality of light-inflecting elements each interposed in the path of said light beam in a respective one of said channels, said light beam inflected by said element, each of said light-inflecting elements being independently movable to shift the time-scale position at which said respective light beam strikes said record, said shift being in the direction parallel to the direction of movement of said record, means for independently moving each of said light-inflecting elements to a pre-programmed rate-of-movement to shift the time-scale position of the light beam relative to the moving recording film in accordance with a predetermined function of time $F_n(t)$, said moving means varying said time-scale position continuously with respect to said constant rate-of-movement of said recording film during recording of said record.

2. In a channelized oscillographic camera of the type wherein a plurality of light beams are transmitted to a recording film moving at a constant rate from a plurality of mirrors which oscillate to vary the position of the light beam in the respective channel perpendicular to the direction of motion of the recording film to provide a time-scale record of the oscillations of the mirrors, means for varying the time-scale position at which the light beam strikes the moving recording film in each of said channels, comprising: a plurality of time mirrors, each of said time mirrors interposed in the path of said light beam in a respective one of said channels, each of said mirrors being pivotable about an axis, said axis being substantially parallel to the plane of said moving recording film and substantilly perpendicular to the direction of motion of said moving recording film such that pivotal movement of said time mirror shifts the time-scale position at which said light beam strikes said recording film by moving said light beam in the direction parallel to the direction of movement of said recording film, means for pivoting each of said time mirrors independently at a preprogrammed angular rate-of-movement which rate-of-movement is in accordance with an arbitrary mathematical function $F_n(t)$, said means being adapted to vary said angular rate-of-movement about said axis continuously during recording of said record with respect to the constant rate-of-movement of said recording film.

3. An oscillographic camera for photographically recording a plurality of input signals, comprising: a fixed light source, a light sensitive recording medium, means for moving said recording medium at a constant speed, a plurality of optical elements defining a plurality of channels from said light source to said light sensitive medium, a plurality of galvanometer mirrors each in a respective one of said channels, which mirror oscillates in response to the respective signal to thereby deflect a light beam in each of said channels at right angles to the direction of motion of said light sensitive medium in response to fluctuations of said signal at said respective galvanometer mirror, a plurality of light-inflecting elements each interposed in a respective one of said channels between said light source and said recording medium, each of said light-inflecting elements being independently movable to shift the time-scale position at which the light beam strikes said record, said shift being in a direction parallel to the direction of movement of said record, means for independently moving each of said light-inflecting elements at a pre-programmed rate-of-movement to shift the time-scale position of the light beam relative to the moving record in accordance with a predetermined non-linear function of time, said means being adapted to vary said time-scale position continuously with respect to said constant rate-of-movement of said recording medium during recording of said signals.

4. An oscillographic camera for photographically recording a plurality of input signals, comprising: a fixed light source, a light sensitive recording medium, means for moving said recording medium at a constant speed, a plurality of optical elements defining a plurality of channels from said light source to said light sensitive medium, a plurality of galvantometer mirrors each in a respective one of said channels, each of said mirrors being adapted to oscillate in response to the respective signal to thereby deflect a light beam in each of said channels at right angles to the direction of motion of said light sensitive medium in response to fluctuations of said signal at said respective galvanometer mirror, a plurality of time mirrors, each of said time mirrors interposed in the path of said light beam in a respective one of said channels, each of said mirrors being pivotable about an axis, said axis being substantially parallel to the plane of said moving record and substantially perpendicular to the direction of motion of said moving recording medium such that pivotal movement of said time mirror shifts the time-scale position at which said light beam strikes said recording medium by moving said light beam in the direction parallel to the direction of movement of said recording medium; means for pivoting each of said time mirrors independently at a pre-programmed angular rate-of-movement which rate-of-movement is in accordance with an arbitrary mathematical function $F_n(t)$, said means being adapted to vary said angular rate of movement about said axis continuously during recording of said signals with respect to the constant rate-of-movement of said recording medium.

5. An oscillographic camera for photographically recording a plurality of input signals, comprising: a fixed light source, a light sensitive recording medium, means for moving said recording medium at a constant speed, a plurality of optical elements defining a plurality of channels from said light source to said light sensitive medium, a plurality of galvanometer mirrors each in a respective one of said channels, each of said mirrors being adapted to oscillate in response to the respective signal to thereby deflect a light beam in each of said channels at right angles to the direction of motion of said light sensitive medium in response to fluctuations of said signal at said respective galvanometer mirror, a plurality of time mirrors, each of said time mirrors interposed in the path of said light beam in a respective one of said channels, each of said mirrors being pivotable about an axis, said axis being substantially parallel to the plane of said moving recording medium and substantially perpendiculr to the direction of motion of said moving recording medium such that pivotal movement of said time mirror shifts the time-scale position at which said light beam strikes said recording medium by moving said light beam in the direction parallel to the direction of movement of said recording medium; means for pivoting each of said time mirrors independently at a pre-programmed angular rate-of-movement which rate-of-movement is in accordance with a predetermined function of time $B_nF(t)$, said means including a cam having a rise rate equal to $B_n$ operably connected to said time mirror to vary said time-scale position continuously with respect to said constant rate-of-movement of said recording medium during recordation of said signals.

References Cited in the file of this patent

UNITED STATES PATENTS

| | | |
|---|---|---|
| 2,243,729 | Ellis | May 27, 1941 |
| 2,440,970 | Palmer | May 4, 1948 |
| 2,652,742 | Walsh | Sept. 22, 1953 |
| 2,724,310 | Paine | Nov. 22, 1955 |
| 2,861,507 | Palmer | Nov. 25, 1958 |

FOREIGN PATENTS

| | | |
|---|---|---|
| 520,693 | Great Britain | Oct. 27, 1938 |
| 521,221 | Great Britain | May 15, 1940 |
| 899,361 | France | May 29, 1945 |